(12) United States Patent
Chang et al.

(10) Patent No.: US 12,393,037 B2
(45) Date of Patent: Aug. 19, 2025

(54) HEAD MOUNTED DISPLAY DEVICE AND STRAP MODULE THEREOF

(71) Applicant: HTC Corporation, Taoyuan (TW)

(72) Inventors: Li-Hsun Chang, Taoyuan (TW); Kuan-Ying Ou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 444 days.

(21) Appl. No.: 18/087,822

(22) Filed: Dec. 23, 2022

(65) Prior Publication Data

US 2024/0210707 A1 Jun. 27, 2024

(51) Int. Cl.
*G02B 27/01* (2006.01)

(52) U.S. Cl.
CPC .. *G02B 27/0176* (2013.01); *G02B 2027/0154* (2013.01)

(58) Field of Classification Search
CPC ............... G02B 27/0176; G02B 2027/0154
USPC ......................................................... 359/630
See application file for complete search history.

(56) References Cited

U.S. PATENT DOCUMENTS

| | | | |
|---|---|---|---|
| 2019/0346682 A1 | 11/2019 | Kang et al. | |
| 2021/0216099 A1* | 7/2021 | Goodner | G02B 27/0176 |
| 2021/0381639 A1* | 12/2021 | Howard | F16M 13/04 |
| 2023/0288709 A1* | 9/2023 | Yeh | G02B 27/0176 |
| 2024/0142782 A1* | 5/2024 | Yuan | G02B 27/0176 |
| 2025/0052366 A1* | 2/2025 | Tompkins | A44C 5/0053 |

FOREIGN PATENT DOCUMENTS

| | | |
|---|---|---|
| CN | 212905719 | 4/2021 |
| CN | 113189775 | 7/2021 |

OTHER PUBLICATIONS

"Notice of allowance of Taiwan Counterpart Application", issued on May 30, 2023, p. 1-p. 4.

* cited by examiner

*Primary Examiner* — Stephone B Allen
*Assistant Examiner* — Boutsikaris Leonidas
(74) *Attorney, Agent, or Firm* — JCIPRNET (57) ABSTRACT

A head mounted display device and a strap module thereof are provided. The strap module includes a casing, two straps, two elastic elements, a coupling element and a braking element. The ends of the two straps are respectively connected to opposite sides of a host. The two straps are at least partially overlapped and accommodated in the casing. Two ends of the first elastic element are respectively connected to the casing and the first strap. Two ends of the second elastic element are respectively connected to the casing and the second strap. The elastic recovery force of the two elastic elements is used to drive the two straps to move relative to the casing to increase the overlapping degree of the two straps. The coupling element is rotatably disposed at the casing and simultaneously couples the two straps. The braking element is movably disposed at the casing. When the braking element is in a brake position, the coupling element is braked to fix the overlapping degree of the two straps. The braking element is separated from the coupling element when it is in a movable position.

18 Claims, 6 Drawing Sheets

HEAD MOUNTED DISPLAY DEVICE AND STRAP MODULE THEREOF

BACKGROUND

Technical Field

The application relates to a display device and a strap module thereof, and in particular, to a head mounted display device and a strap module thereof.

Description of Related Art

As the technology industry develops day by day, the types, functions, and ways of use of display devices are becoming more and more diverse, and head-mounted display devices that can be directly worn on the head of a user are also emerging accordingly. After the user wears the head mounted display device, in addition to seeing a three-dimensional image, the image will also change with the rotation of the user's head, which can provide the user with a more immersive experience.

However, different users have different head circumferences, and it is necessary to match a strap module whose length can be adjusted to be suitable for different users. At present, the length of the strap module is generally adjusted through the knob to adjust the tightness. Users will spend more time turning the knob to loosen the strap module before putting it on, and spend time turning the knob again to shorten the length of the strap module and adjust the tightness. At the same time, it takes a lot of time to turn the knob to loosen the strap module for taking off the head mounted display device.

SUMMARY

The application provides a display device and a strap module thereof, which can improve the problem of time-consuming wearing.

The head mounted display device includes a host and a strap module. The strap module includes a casing, a first strap, a second strap, a first elastic element, a second elastic element, a coupling element, a braking element, a shape memory alloy element, and a resetting element. The first strap has a first end and a first adjustment section. The second strap has a second end and a second adjustment section. The first end and the second end are respectively connected to opposite sides of the host. The first adjustment section and the second adjustment section are at least partially overlapped and accommodated in the casing. Two ends of the first elastic element are respectively connected to the casing and the first adjustment section. Two ends of the second elastic element are respectively connected to the casing and the second adjustment section. The elastic recovery force of the first elastic element and the second elastic element is used to drive the first adjustment section and the second adjustment section to move relative to the casing to increase the overlapping degree with each other. The coupling element is rotatably disposed at the casing and simultaneously coupled to the first adjustment section and the second adjustment section. The braking element is movably disposed at the casing. When the braking element is in a brake position, the coupling element is braked to fix the overlapping degree of the first adjustment section and the second adjustment section. When the braking element is in a movable position, it is separated from the coupling element. The shape memory alloy element is connected between the casing and the braking element. The resetting element is connected between the casing and the braking element. The shape memory alloy element is used for electric heating and contraction to drive the braking element to move from the brake position to the movable position. The resetting element is used to keep the braking element in the brake position when the shape memory alloy element is in a power-off state.

The strap of the application includes a casing, a first strap, a second strap, a first elastic element, a second elastic element, a coupling element, a braking element, a shape memory alloy element, and a resetting element. The first strap has a first end and a first adjustment section. The second strap has a second end and a second adjustment section. The first end and the second end are respectively connected to opposite sides of a host. The first adjustment section and the second adjustment section are at least partially overlapped and accommodated in the casing. Two ends of the first elastic element are respectively connected to the casing and the first adjustment section. Two ends of the second elastic element are respectively connected to the casing and the second adjustment section. The elastic recovery force of the first elastic element and the second elastic element is used to drive the first adjustment section and the second adjustment section to move relative to the casing to increase the overlapping degree with each other. The coupling element is rotatably disposed at the casing and simultaneously coupled to the first adjustment section and the second adjustment section. The braking element is movably disposed at the casing. When the braking element is in a brake position, the coupling element is braked to fix the overlapping degree of the first adjustment section and the second adjustment section. When the braking element is in a movable position, it is separated from the coupling element. The shape memory alloy element is connected between the casing and the braking element. The resetting element is connected between the casing and the braking element. The shape memory alloy element is used for electric heating and contraction to drive the braking element to move from the brake position to the movable position. The resetting element is used to keep the braking element in the brake position when the shape memory alloy element is in a power-off state.

Based on above, in the head mounted display device and the strap module thereof in the application, it can directly stretch the head mounted display device and be used for wearing. And the elastic elements make the head mounted display device automatically tighten around the head, easily and quickly.

DESCRIPTION OF THE EMBODIMENTS

Figure 1:
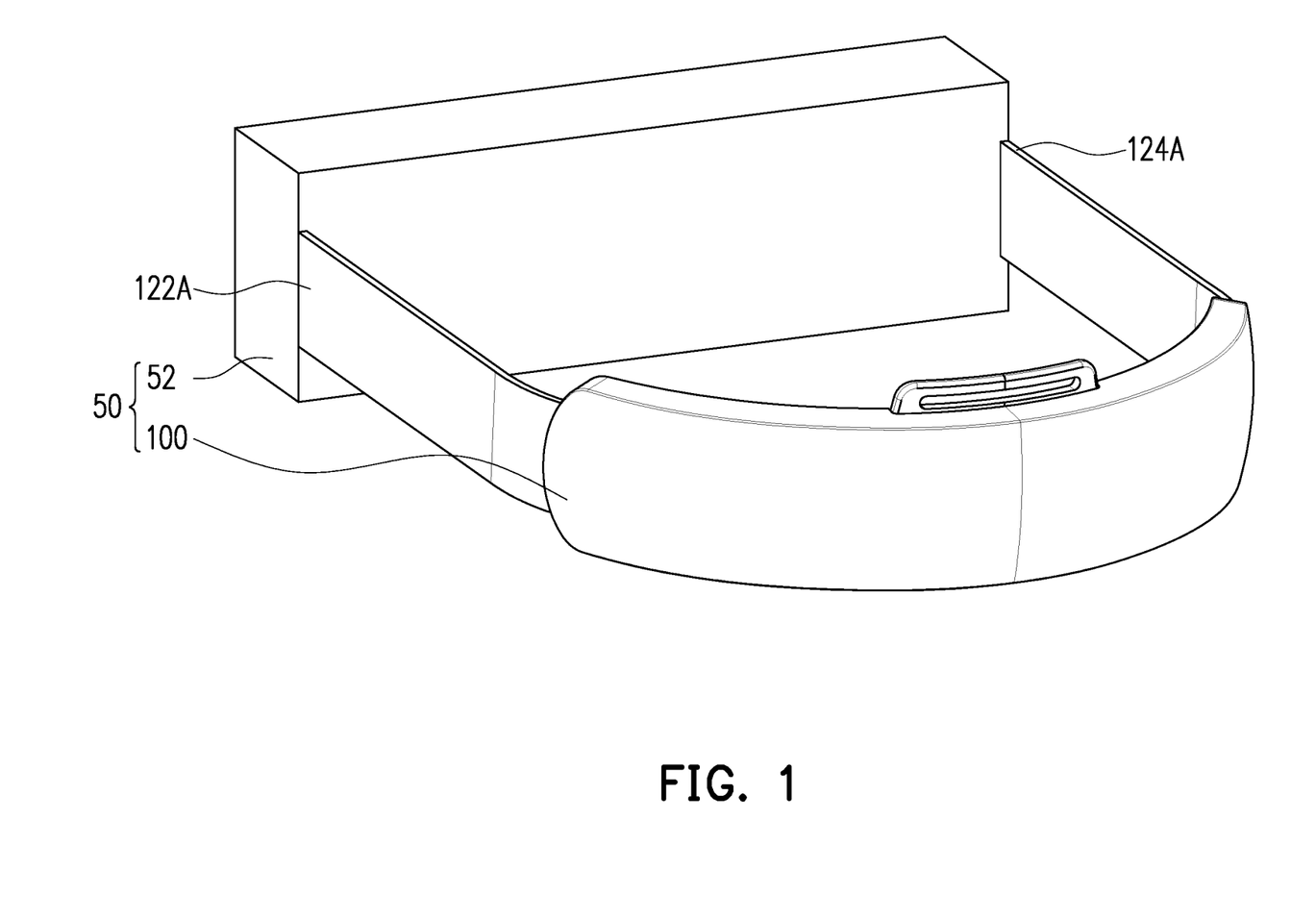
FIG. 1 is a schematic diagram of a head mounted display device according to an embodiment of the present invention.
Figure 2:
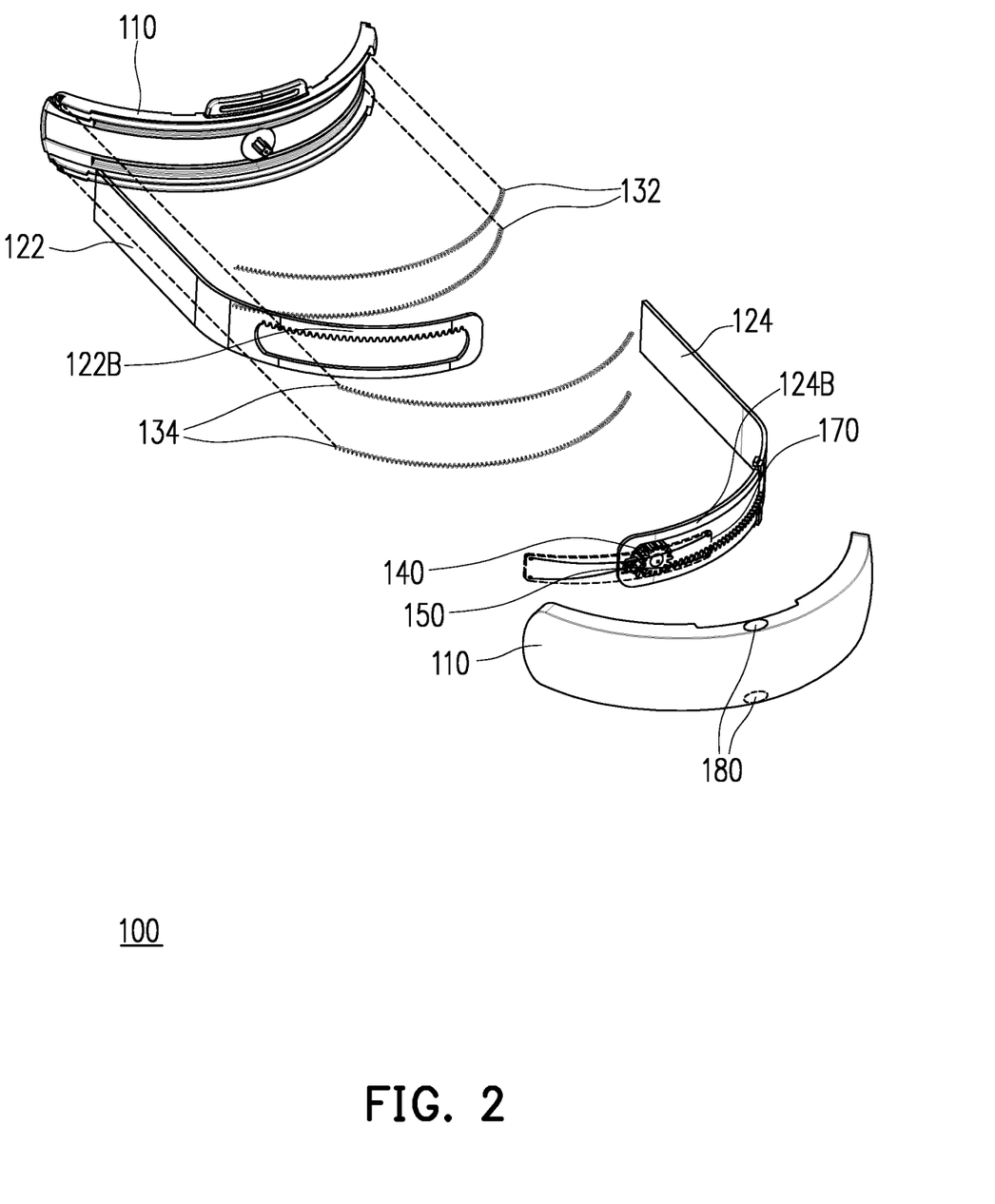
FIG. 2 is a schematic diagram of a disassembled state of a strap module of the head mounted display device of FIG. 1.

FIG. 1 is a schematic diagram of a head mounted display device according to an embodiment of the present invention. FIG. 2 is a schematic diagram of a disassembled state of a strap module of the head mounted display device of FIG. 1. Referring to FIG. 1, the head mounted display device 50 of the embodiment includes a host 52 and a strap module 100.

In the embodiment, the host 52 is a head mounted display device, for example, it can be applied to the fields of virtual reality system, augmented reality system or mixed reality system. The host 52 can include components such as an optical system and a protective casing, and can be provided with a display or is suitable for placing a display. The aforementioned display device may be a built-in display or an additional portable display (such as a smart phone, etc.), but the application is not limited thereto. The optical system includes optical elements for changing the optical path of the display, such as lenses, light guides, or prisms.

Referring to FIG. 1 and FIG. 2, the strap module 100 of the embodiment includes a casing 110, a first strap 122, a second strap 124, a first elastic element 132, a second elastic element 134, a coupling element 140, and a braking element 150. The first strap 122 has a first end 122A and a first adjustment section 122B. The second strap 124 has a second end 124A and a second adjustment section 124B. The first end 122A and the second end 124A are respectively connected to opposite sides of the host 52. In the embodiment, the first end 122A and the second end 124A are fixedly connected to the host 52, but the first end 122A and the second end 124A can also be detachably connected to the host 52. The first adjustment section 122B and the second adjustment section 124B are at least partially overlapped and accommodated in the casing 110.

Two ends of the first elastic element 132 are respectively connected to the casing 110 and the first adjustment section 122B. Two ends of the second elastic element 134 are respectively connected to the casing 110 and the second adjustment section 124B. The elastic recovery force of the first elastic element 132 and the second elastic element 134 is used to drive the first adjustment section 122B and the second adjustment section 124B to move relative to the casing 110 to increase the overlapping degree with each other. Therefore, when the user applies force to the host 52 and the casing 110 to pull them apart so as to wear the head mounted display device 50 on the head, the first elastic element 132 and the second elastic element 134 may be stretched by force. When the head mounted display device 50 is worn on the head, the user no longer applies force, and the elastic recovery force of the first elastic element 132 may drive the first adjustment section 122B to move relative to the casing 110. The elastic recovery force of the second elastic element 134 may also drive the second adjustment section 124B to move relative to the casing 110, thereby increasing an overlapping degree between the first adjustment section 122B and the second adjustment section 124B. In this way, the head mounted display device 50 can be tightened around the head.

It can be seen from this that, when wearing the head mounted display device 50 of the embodiment, the user only needs to simply stretch the head mounted display device 50 and put it on the head, so that the head mounted display device 50 can be automatically tightened on the head through the action of the elastic recovery force. In this way, the time spent on loosening the knob, adjusting the length and tightening the knob again in the prior art can be saved.

The coupling element 140 rotatably disposed at the casing 110 and simultaneously coupled to the first adjustment section 122B and the second adjustment section 124B. That is, the first adjustment section 122B and the second adjustment section 124B will move relative to the casing 110 synchronously. The first adjustment section 122B and the second adjustment section 124B cannot move relative to the casing 110 independently, which can avoid the position shift of the casing 110.

In the embodiment, the material of the first elastic element 132 can be a shape memory alloy, the material of the second elastic element 134 can also be a shape memory alloy, or both can be made of a shape memory alloy. Therefore, the length of the first elastic element 132 and/or the second elastic element 134 can be changed by electric heating. Moreover, the way of electric heating can properly strengthen the tightness of fixing.

Figure 3A:
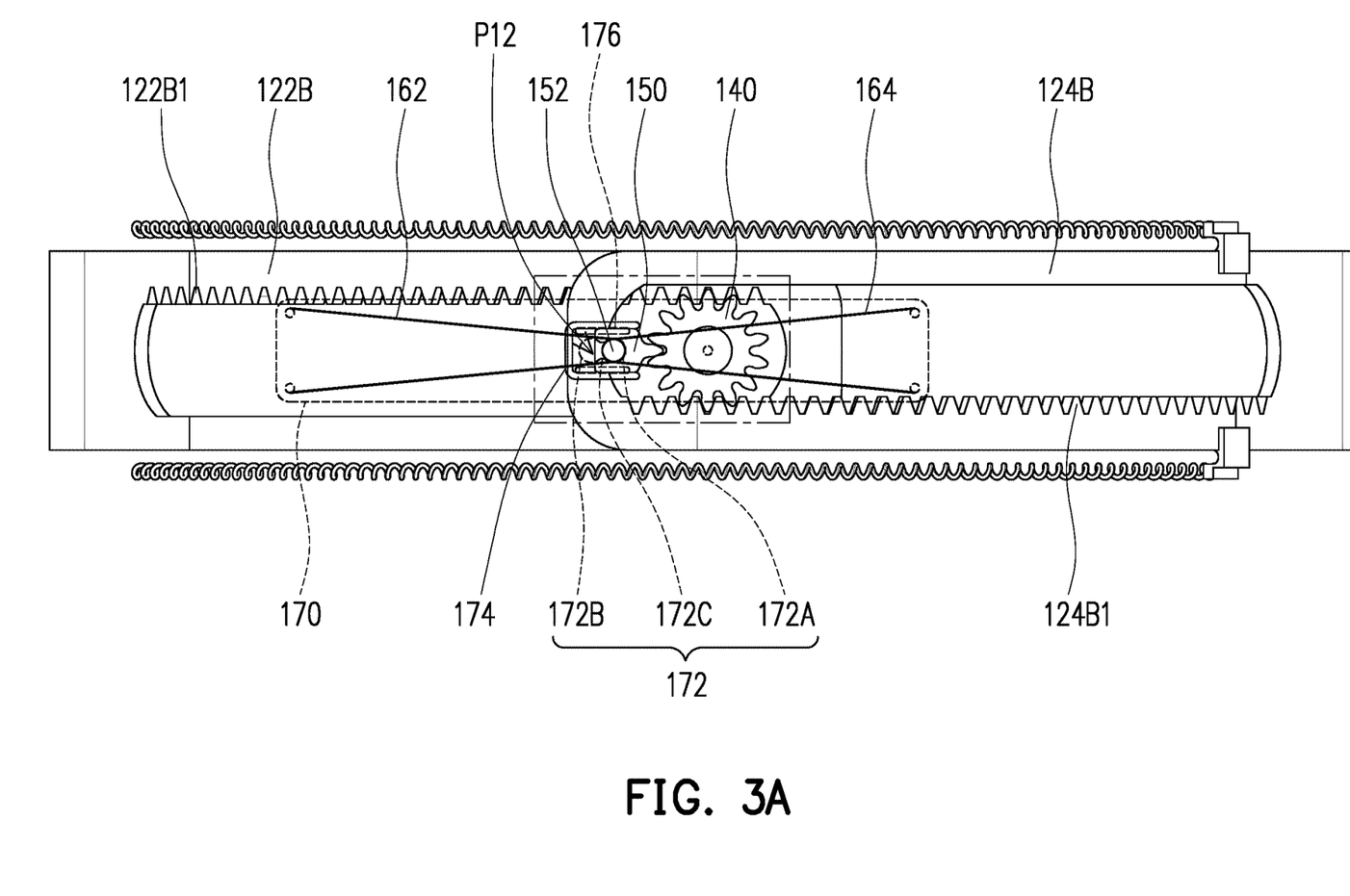
FIG. 3A is a partially enlarged schematic view of a braking element of the head mounted display device of FIG. 1 in a brake position.
Figure 3B:
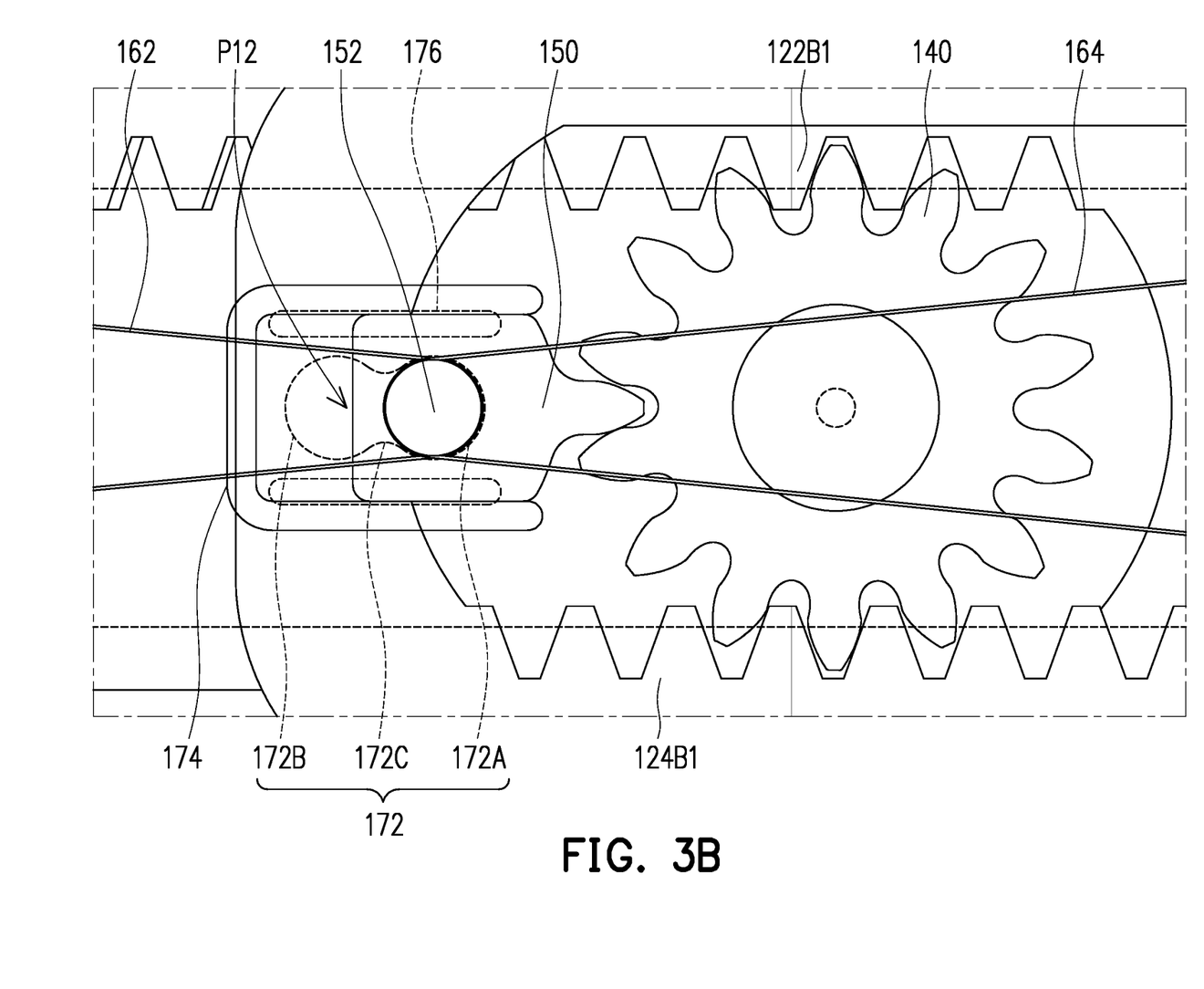
FIG. 3B is a partially enlarged schematic view of FIG. 3A.

FIG. 3A is a partially enlarged schematic view of a braking element of the head mounted display device of FIG. 1 in a brake position. FIG. 3B is a partially enlarged schematic view of FIG. 3A. Referring to FIG. 3A and FIG. 3B, the braking element 150 is movably disposed at the casing 110. The braking element 150 brakes the coupling element 140 in a brake position P12 as shown in FIG. 3B to fix the overlapping degree of the first adjustment section 122B and the second adjustment section 124B.

Figure 4A:
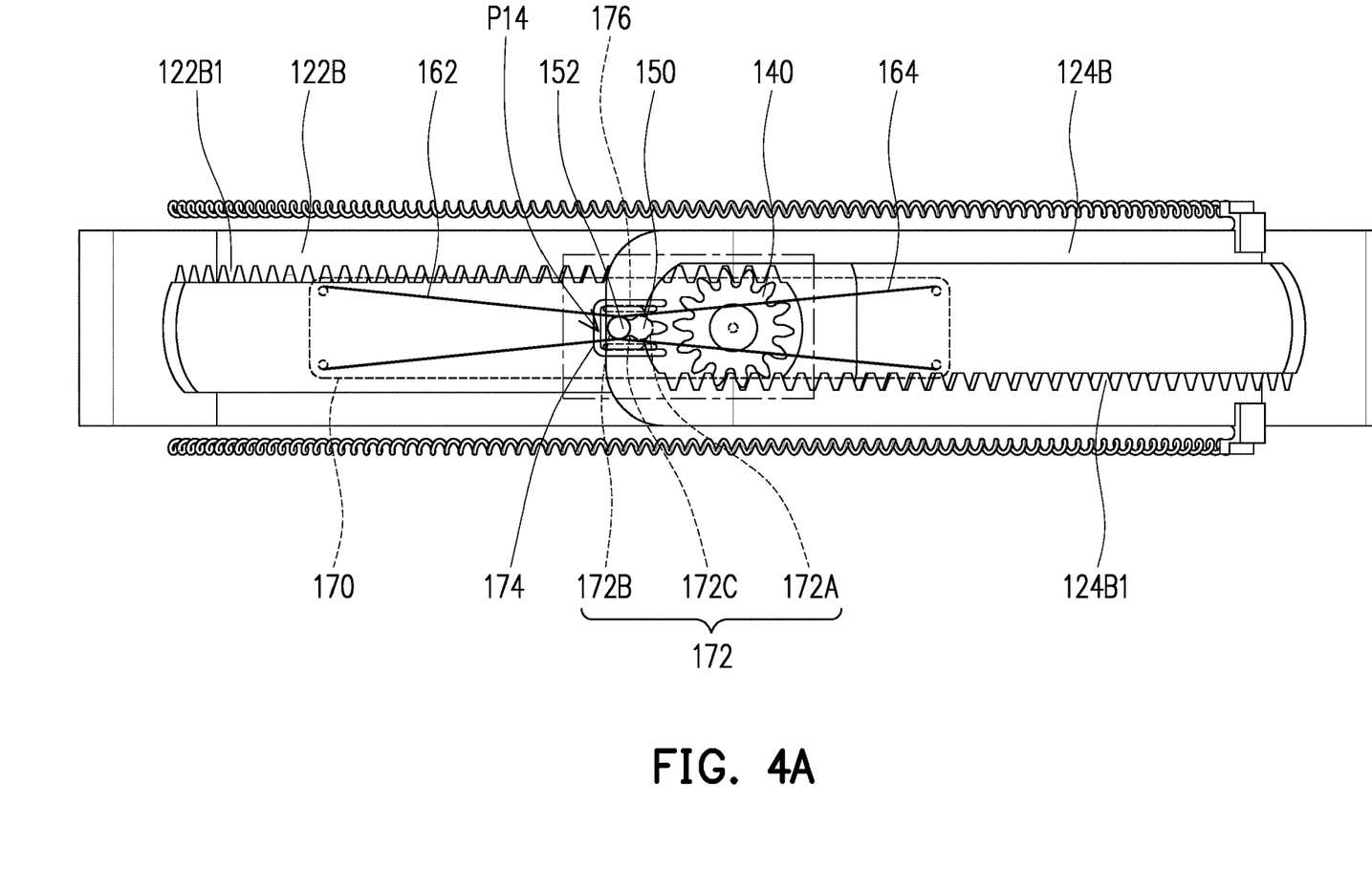
FIG. 4A is a partially enlarged schematic diagram of the braking element of the head mounted display device of FIG. 1 in a movable position.
Figure 4B:
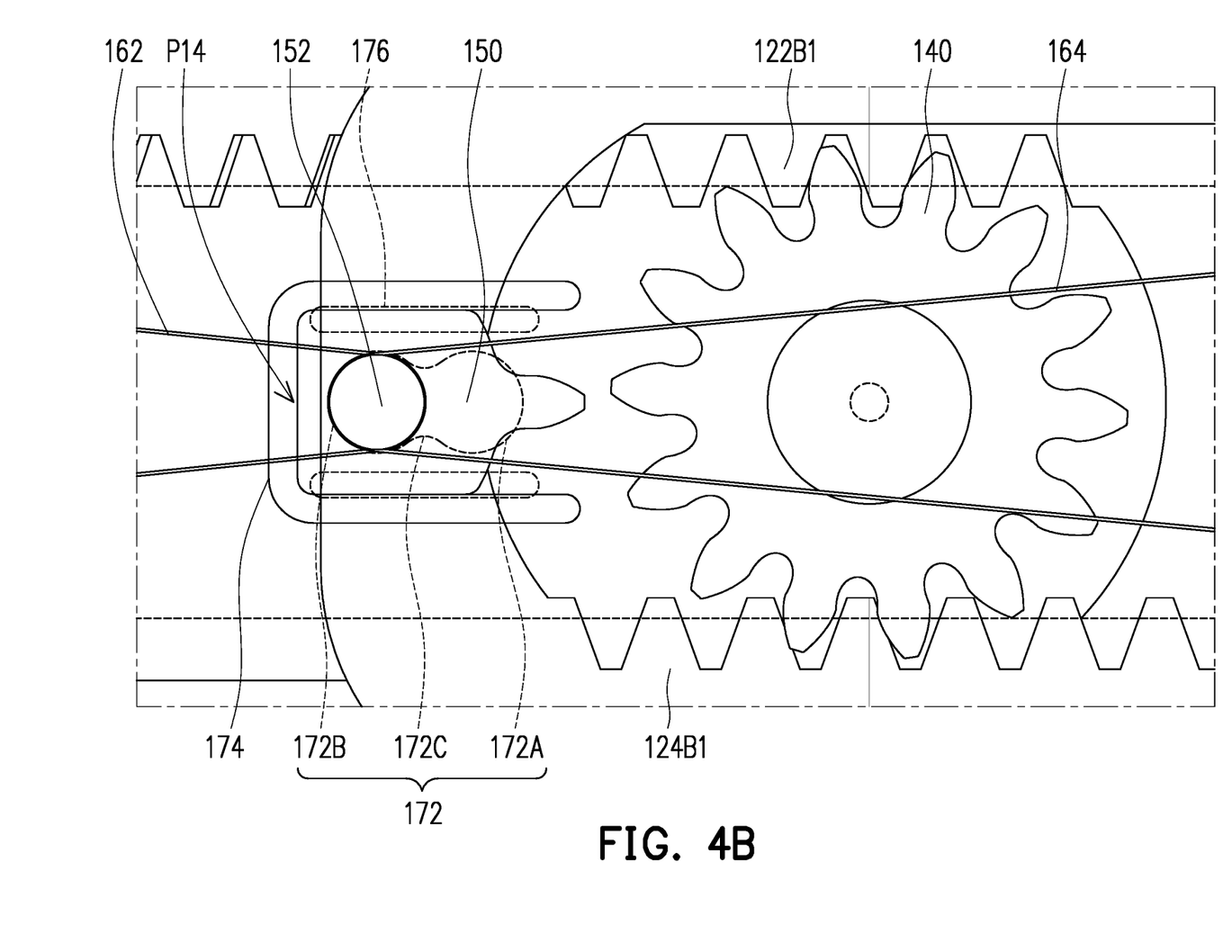
FIG. 4B is a partially enlarged schematic view of FIG. 4A.

FIG. 4A is a partially enlarged schematic diagram of the braking element of the head mounted display device of FIG. 1 in a movable position. FIG. 4B is a partially enlarged schematic view of FIG. 4A. Referring to FIG. 4A and FIG. 4B, the braking element 150 is separated from the coupling element 140 in the movable position P14 as shown in FIG. 4B, so that the first adjustment section 122B and the second adjustment section 124B can move relative to the casing 110 to change the overlapping degree of the two. Therefore, when the user really tightens the head mounted display device 50 to the head, the braking element 150 can brake the coupling element 140 to prevent the head mounted display device 50 from being loosened from the head due to shaking or other reasons.

In the embodiment, the coupling element 140 is a gear, but the application is not limited thereto. The first adjustment section 122B is coupled to the coupling element 140 by teeth 122B1 on one side of the coupling element 140, and the second adjustment section 124B is coupled to the coupling element 140 by teeth 124B1 on the other side of the coupling element 140.

Referring to FIG. 3A and FIG. 4A, in the embodiment, the strap module 100 further includes a shape memory alloy element 162 and a resetting element 164. The shape memory alloy element 162 is connected between the casing 110 and the braking element 150. The resetting element 164 is connected between the casing 110 and the braking element 150. The shape memory alloy element 162 is used for electric heating and contraction to drive the braking element 150 to move from the brake position P12 to the movable position P14. The resetting element 164 is used to keep the braking element 150 in the brake position P12 when the shape memory alloy element 162 is in a power-off state. Therefore, when the user wants to wear the head mounted display device 50 on the head, the shape memory alloy element 162 is energized and contracted to overcome the elastic force of the resetting element 164. In this way, the braking element 150 is moved from the brake position P12 to the movable position P14 to allow the first adjustment section 122B and the second adjustment section 124B to move relative to the casing 110. When the user tightens the head mounted display device 50 on the head, the shape memory alloy element 162 is powered off, and the resetting element 164 drives the braking element 150 to move from the movable position P14 to the brake position P12 with its elastic recovery force. In this way, the first adjustment section 122B and the second adjustment section 124B are prohibited from moving relative to the casing 110, and the head mounted display device 50 is tightly bound to the user's head. In other embodiments, the shape memory alloy element 162 can also be replaced by a general elastic member or other mechanical structures to actuate the braking element 150 to move between the brake position P12 and the movable position P14.

Referring to FIG. 3B and FIG. 4B, in the embodiment, the strap module 100 further includes a positioning element 170, which is disposed in the casing 110 and has a positioning groove 172. The braking element 150 has a protrusion 152. When the braking element 150 is in the brake position P12, the protrusion 152 is located at a first end 172A of the positioning groove 172. When the braking element 150 is in the movable position P14, the protrusion 152 is located at a second end 172B of the positioning groove 172. In addition, the positioning element 170 can also have a sliding slot 174 for limiting the moving direction of the braking element 150.

In the embodiment, a neck 172C of the positioning groove 172 is located between the first end 172A and the second end 172B. A width of the neck 172C is slightly smaller than a width of the protrusion 152. Therefore, if the protrusion 152 wants to pass through the neck 172C, it must exert enough force to widen the neck 172C. In other words, when the protrusion 152 is located at the first end 172A of the positioning groove 172, the positioning element 170 can provide proper force to position the braking element 150 in a brake position P12. When the protrusion 152 is located at the second end 172B of the positioning groove 172, the positioning element 170 can provide proper force to position the braking element 150 in the movable position P14. The positioning element 170 can also be provided with a slot 176 beside the positioning groove 172, so as to weaken the structural strength around the positioning groove 172 and facilitate the deformation of the neck 172C.

In the embodiment, the material of the resetting element 164 can also be a shape memory alloy, that is, the resetting element 164 can be energized and contracted to drive the braking element 150 to move from the movable position P14 to the brake position P12. After the protrusion 152 passes through the neck 172C, it can stay stably at the first end 172A or the second end 172B. In other words, when the shape memory alloy element 162 and the resetting element 164 are powered off, the protrusion 152 can stay stably at the first end 172A or the second end 172. In this way, power consumption can be saved and the service life of the shape memory alloy element 162 and the resetting element 164 can be extended.

Referring to FIG. 2, in the embodiment, the strap module 100 can further include a switch 180, which is disposed in the casing and is used to power on and off the shape memory alloy element 162. The switch 180 can be a mechanical switch, a touch switch or other forms of switches. Touch switches can be actuated using capacitive sensing, pressure sensing, or other means of sensing.

Referring to FIG. 1 and FIG. 2, when the user wears the head mounted display device 50, one hand may hold the host 52, and the other hand may grasp the strap module 100 at the rear, pull the two apart and put the head mounted display device 50 on. Therefore, it can be detected that the user's fingers grab the strap module 100 at the rear and touch the switch 180 to judge that the user needs to put on and take off the head mounted display device 50. The setting position of the switch 180 can be at a position easy to grasp by general users.

Referring to FIG. 1, FIG. 2 and FIG. 3A, when the switch 180 is not actuated by the user, the braking element 150 brakes the coupling element 140 to prevent the first adjustment section 122B and the second adjustment section 124B from moving relative to the casing 110. Therefore, the head mounted display device 50 is really tightened on the user's head. Referring to FIG. 1, FIG. 2 and FIG. 4A, when the user activates the switch 180, the shape memory alloy element 162 is energized and heated to contract. Thereby, the braking element 150 is moved to the movable position P14 to allow the first adjustment section 122B and the second adjustment section 124B to move relative to the casing 110. At this time, the user can pull off the strap module 100 and put the head mounted display device 50 on the head. When the user puts on the head mounted display device 50 and detects that the user's hand leaves the switch 180, the first elastic element 132 and the second elastic element 134 will be energized and heated to contract to appropriately increase the degree of tightness. In order to allow the first elastic element 132 and the second elastic element 134 to have enough time to act, it can be delayed for a short period of time. Then, the shape memory alloy element 162 is energized and contracted to drive the braking element 150 to move to the brake position P12 and lock.

In summary, in the head mounted display device and its strap module of the application, the strap module itself is elastic and can be stretched directly for wearing, and it may automatically contract to adapt to different sizes of heads when it is released. The strap module can also be stretched directly when taking it off, providing a simple and intuitive way to wear. When a switch is installed, it can be activated by detecting the user touching the strap module, and then the tightness is increased by the shape memory alloy and then fixed by the braking element. When the head mounted display device needs to be taken off, the user can directly pull the strap module to take it off by touching the switch of the strap module.

What is claimed is:
1. A head mounted display device, comprising:
a host;
a strap module, comprises:
  a casing;
  a first strap, having a first end and a first adjustment section;
  a second strap, having a second end and a second adjustment section, wherein the first end and the second end are respectively connected to opposite sides of the host, the first adjustment section and the second adjustment section are at least partially overlapped and accommodated in the casing;
  a first elastic element, its two ends are respectively connected to the casing and the first adjustment section;
  a second elastic element, its two ends are respectively connected to the casing and the second adjustment section, wherein an elastic recovery force of the first elastic element and the second elastic element is used to drive the first adjustment section and the second adjustment section to move relative to the casing to increase an overlapping degree with each other;

a coupling element, rotatably disposed at the casing and simultaneously coupled to the first adjustment section and the second adjustment section;

a braking element, movably disposed at the casing, wherein when the braking element is in a brake position, the coupling element is braked to fix the overlapping degree of the first adjustment section and the second adjustment section, the braking element is separated from the coupling element when it is in a movable position;

a shape memory alloy element, connected between the casing and the braking element and used for electric heating and contraction to drive the braking element to move from the brake position to the movable position; and a resetting element, connected between the casing and the braking element and used to keep the braking element in the brake position when the shape memory alloy element is in a power-off state.

2. The head mounted display device according to claim 1, wherein the strap module further comprises a positioning element, disposed in the casing and has a positioning groove, wherein the braking element has a protrusion, and when the braking element is in the brake position, the protrusion is located at a first end of the positioning groove, when the braking element is in the movable position, the protrusion is located at a second end of the positioning groove.

3. The head mounted display device according to claim 2, wherein a neck of the positioning groove is located between the first end and the second end, a width of the neck is slightly smaller than a width of the protrusion.

4. The head mounted display device according to claim 1, wherein a material of the resetting element is shape memory alloy.

5. The head mounted display device according to claim 1, wherein the strap module further comprises a switch, disposed in the casing and used to power on and off the shape memory alloy element.

6. The head mounted display device according to claim 5, wherein the switch is a mechanical switch or a touch switch.

7. The head mounted display device according to claim 1, wherein a material of the first elastic element is shape memory alloy.

8. The head mounted display device according to claim 7, wherein a material of the second elastic element is shape memory alloy.

9. The head mounted display device according to claim 1, wherein the coupling element is a gear.

10. A strap module, comprising:
a casing;
a first strap, having a first end and a first adjustment section;
a second strap, having a second end and a second adjustment section, wherein the first end and the second end are respectively connected to opposite sides of a host, the first adjustment section and the second adjustment section are at least partially overlapped and accommodated in the casing;

a first elastic element, its two ends are respectively connected to the casing and the first adjustment section;

a second elastic element, its two ends are respectively connected to the casing and the second adjustment section, wherein an elastic recovery force of the first elastic element and the second elastic element is used to drive the first adjustment section and the second adjustment section to move relative to the casing to increase an overlapping degree with each other;

a coupling element, rotatably disposed at the casing and simultaneously coupled to the first adjustment section and the second adjustment section;

a braking element, movably disposed at the casing, wherein when the braking element is in a brake position, the coupling element is braked to fix the overlapping degree of the first adjustment section and the second adjustment section, the braking element is separated from the coupling element when it is in a movable position;

a shape memory alloy element, connected between the casing and the braking element and used for electric heating and contraction to drive the braking element to move from the brake position to the movable position; and a resetting element, connected between the casing and used to keep the braking element in the brake position when the shape memory alloy element is in a power-off state.

11. The strap module according to claim 10, further comprises a positioning element, disposed in the casing and has a positioning groove, wherein the braking element has a protrusion, and when the braking element is in the brake position, the protrusion is located at a first end of the positioning groove, when the braking element is in the movable position, the protrusion is located at a second end of the positioning groove.

12. The strap module according to claim 11, wherein a neck of the positioning groove is located between the first end and the second end, and a width of the neck is slightly smaller than a width of the protrusion.

13. The strap module according to claim 10, wherein a material of the resetting element is shape memory alloy.

14. The strap module according to claim 10, further comprises a switch, disposed in the casing and used to power on and off the shape memory alloy element.

15. The strap module according to claim 14, wherein the switch is a mechanical switch or a touch switch.

16. The strap module according to claim 10, wherein a material of the first elastic element is shape memory alloy.

17. The strap module according to claim 16, wherein a material of the second elastic element is shape memory alloy.

18. The strap module according to claim 10, wherein the coupling element is a gear.

* * * * *